US012549061B2

(12) United States Patent
Koh et al.

(10) Patent No.: US 12,549,061 B2
(45) Date of Patent: Feb. 10, 2026

(54) ROTOR FOR AN ACTUATOR

(71) Applicant: Hanon Systems, Daejeon (KR)

(72) Inventors: Michael Koh, Novi, MI (US);
Benjamin Paul Mahoney, Clawson, MI (US)

(73) Assignee: HANON SYSTEMS, Daejeon (KR)

( * ) Notice: Subject to any disclaimer, the term of this patent is extended or adjusted under 35 U.S.C. 154(b) by 331 days.

(21) Appl. No.: 18/163,955

(22) Filed: Feb. 3, 2023

(65) Prior Publication Data

US 2024/0266910 A1 Aug. 8, 2024

(51) Int. Cl.
*H02K 7/04* (2006.01)
(52) U.S. Cl.
CPC ....................... *H02K 7/04* (2013.01)
(58) Field of Classification Search
CPC ............ H02K 7/00; H02K 7/04; H02K 15/00; H02K 15/16
See application file for complete search history.

(56) References Cited

U.S. PATENT DOCUMENTS

| 4,941,861 | A | * | 7/1990 | Painter | ................... | H02K 7/003 |
| | | | | | | 464/155 |
| 5,779,016 | A | | 7/1998 | Kawasaki et al. | | |
| 11,552,522 | B2 | | 1/2023 | Schafer et al. | | |
| 2004/0195924 | A1 | * | 10/2004 | Kuwert | ................ | H02K 1/2733 |
| | | | | | | 310/156.13 |
| 2021/0293285 | A1 | | 9/2021 | Brown et al. | | |

FOREIGN PATENT DOCUMENTS

| CN | 112600340 A | 4/2021 |
| JP | 2000120634 A | 4/2000 |
| JP | 2017034795 A | 2/2017 |
| KR | 20150043506 A | 4/2015 |

* cited by examiner

*Primary Examiner* — Tran N Nguyen
(74) *Attorney, Agent, or Firm* — Shumaker, Loop & Kendrick, LLP; James D. Miller

(57) ABSTRACT

A rotor comprising a rotor body having at least a portion configured to cooperate with a shaft, a support member configured to cooperate with at least one of the portion of the rotor body and the shaft, and a resilient member configured to cooperate with at least one of the portion of the rotor body, the shaft, and the support member to substantially maintain coaxial alignment of the shaft and the rotor. The rotor is part of an actuator of a fluid valve system.

19 Claims, 5 Drawing Sheets

ROTOR FOR AN ACTUATOR

FIELD

The disclosure relates to an actuator, and more particularly to a rotor for an actuator.

BACKGROUND

Rotors with bearings are used in electric motors, in particular in brushless DC motors, for example, in actuators designed for automotive, industrial or domestic applications. It is known to use rotors (as shown in FIG. 1) which rotate about a fixed shaft and include a respective bearing for this purpose. These bearings are mostly formed as radial plain bearings. To achieve substantially frictionless operation, a radial gap is needed between the bearing and the axle. This enables, however, a radial movement of the rotor body, which can lead to undesirable noise.

Additionally, a center of moment of inertia of the prior art rotors is offset from a center of rotating contact. Hence, the rotor is subject to increased wear and develops conical rotation, which adversely impacts the operation of the actuator.

Accordingly, it would be desirable to produce a rotor for an actuator, wherein a performance and durability of the rotor is improved, while a weight, a cost, and complexity of the actuator is minimized.

SUMMARY

In concordance and agreement with the presently described subject matter, a rotor for an actuator, wherein a performance and durability of the rotor is improved, while a weight, a cost, and complexity of the actuator is minimized, has been designed.

In one embodiment, a rotor, comprises: a rotor body having an axis of rotation, wherein the rotor body is configured to cooperate with a shaft having a central axis; a support member configured to cooperate with at least one of the rotor body and the shaft; and a resilient member configured to cooperate with at least one of the rotor body, the shaft, and the support member to substantially maintain coaxial alignment of the shaft and the rotor body.

In another embodiment, an actuator, comprises: a shaft having a central axis; a stator disposed about the shaft; and a rotor having an axis of rotation, and wherein the rotor includes: a rotor body having at least a portion configured to cooperate with the shaft; a support member configured to cooperate with at least one of the portion of the rotor body and the shaft; and a resilient member configured to cooperate with at least one of the portion of the rotor body, the shaft, and the support member to substantially maintain coaxial alignment of the shaft and the rotor.

In yet another embodiment, a method of controlling rotor wear, comprising the steps of: providing a rotor having an axis of rotation, the rotor comprising: a rotor body having at least a portion configured to cooperate with a shaft having a central axis; a support member configured to cooperate with at least one of the portion of the rotor body and the shaft; and a resilient member configured to cooperate with at least one of the portion of the rotor body, the shaft, and the support member; and generating centripetal force to substantially maintain coaxial alignment of the shaft and the rotor.

In some embodiments, the rotor body includes a support portion configured to cooperate with the resilient member.

In some embodiments, the support portion is integrally formed with a remainder of the rotor body.

In some embodiments, at least one of the support portion of the rotor body and the support member has a generally semicircular shape.

In some embodiments, the support member is disposed adjacent the shaft opposite the support portion of the rotor body.

In some embodiments, a lubricating fluid pocket is formed between the shaft and the support portion of the rotor.

In some embodiments, at least an edge region of the support portion of the rotor body is tapered to facilitate installation of the resilient member.

In some embodiments, the rotor body is configured to cooperate with a rotor magnet.

In some embodiments, an outer circumferential surface of the rotor body includes an annular array of spaced apart engagement elements configured to cooperate with an annular array of spaced apart engagement elements formed on an inner circumferential surface of a rotor magnet.

In some embodiments, the support member includes a retention feature for maintaining a position of the resilient member relative thereto.

In some embodiments, the support member includes a first protuberance and a second protuberance extending radially away from the shaft forming a channel therebetween.

In some embodiments, the resilient member is configured to be received in the channel formed between the protuberances of the support member.

In some embodiments, the support member includes a retention feature to militate against a movement thereof relative to the shaft.

In some embodiments, the shaft includes a retention feature corresponding to the retention feature of the support member to militate against relative movement therebetween.

In some embodiments, the centripetal force is generated by a rotation of the rotor.

In some embodiments, the centripetal force causes the resilient member to contact at least one point on the rotor body and at least one point on the support member.

In some embodiments, the centripetal force causes the support member to contact at least one point on the shaft.

In some embodiments, the centripetal force causes the resilient member to militate against displacement of the shaft in a first direction and a second direction perpendicular to the first direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
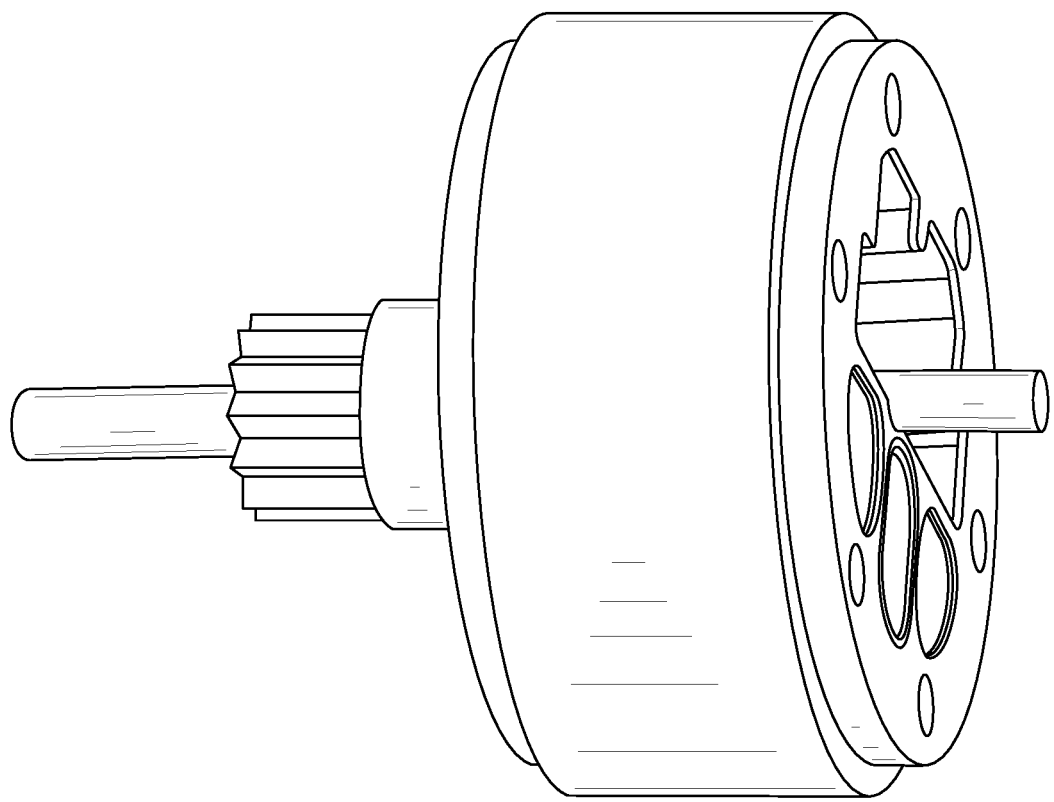
FIG. 1 is a perspective view of a prior art rotor.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 2-5 depict an exemplary embodiment of a rotor 2 according to the present disclosure. The rotor 2 has an axis of rotation A and may comprise a rotor body 4, a support member 5, and a resilient member 6. The rotor body 4 shown has a generally circular cross-sectional shape. A shaft 8 may be disposed in a central bore 10 formed in the rotor body 4 extending axially outwardly therefrom. In some embodiments, the rotor body 4 may include a cavity 12 formed therein. The cavity 12 may be provided to reduce a weight of the rotor body 4, in turn reducing a moment of inertia thereof. It is understood that the rotor body 4 may have any suitable size and shape, and include additional cavities if desired. In certain embodiments, the rotor body 4 may be formed by injection molding. Various other methods of producing the rotor body 4 may be employed if desired.

An over-molded support portion 14 of the rotor body 4 may axially extend into the cavity 16. Although the support portion 14 shown is integrally formed with a remaining portion of the rotor body 4, it is understood that the support portion 14 may be separate and distinct component if desired. As more clearly shown in FIGS. 3 and 4, the support portion 14 may have a generally semi-circular shape. The support portion 14 may be configured to cooperate with the shaft 8. As depicted, the support portion 14 may include a recess 15 configured to receive a portion of the shaft 8 therein. A lubricating fluid pocket 17, shown more clearly in FIG. 5, may also be formed between the support portion 14 of the rotor body 4 and/or the support member 5 and the shaft 8. It is understood that the pocket 17 may have any shape, size, and configuration as needed to permit a flow of lubricating fluid and adequate lubrication of the rotor 2. In certain embodiments, edge regions 16, 18 of the support portion 14 may be tapered to facilitate installation of the resilient member 6 onto the rotor body 4. Referring now to FIG. 4, the support portion 14 may also include a projection 20 extending radially outward. The projection 20 may be configured to ensure proper orientation of the resilient member 6 during an installation thereof. Opposing sides 22, 24 of the projection 20 may also be tapered to facilitate installation of the resilient member 6. Additionally, the projection 20 may be configured to militate against an undesired rotational movement of the resilient member 6 during operation of the rotor 2.

Figure 3:
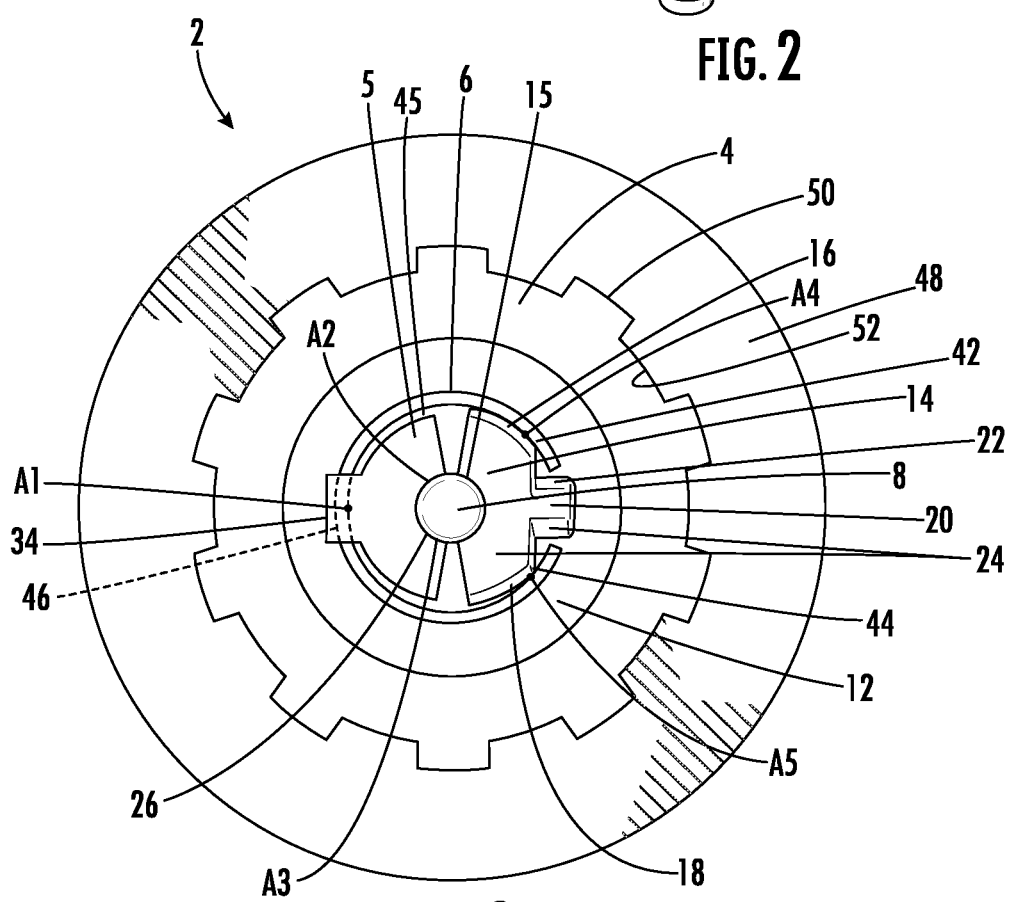
FIG. 3 is a top plan sectional view of the rotor of FIG. 2.
Figure 4:
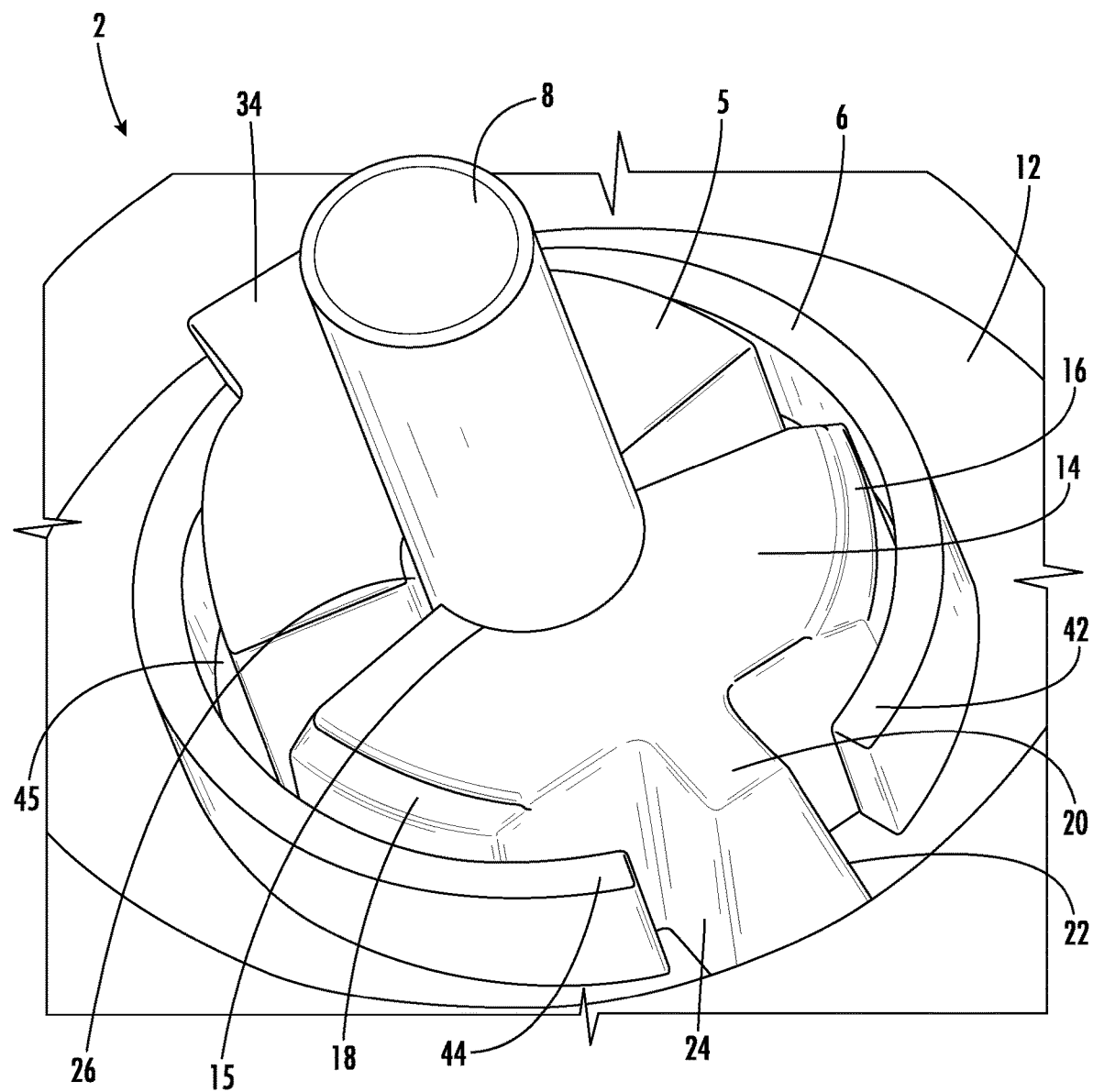
FIG. 4 is an enlarged perspective view of a portion of the rotor of FIGS. 2 and 3.

In FIG. 3, it can be seen that the support member 5 also cooperates with the shaft 8. The support portion 14 may include a recess 26 configured to receive a portion of the shaft 8 therein. The support member 5 may have a generally semi-circular shape. As depicted, the support member 5 may include a retention feature 30 configured to cooperate with a corresponding retention feature 32 of the shaft 8 to militate against relative axial movement therebetween along the shaft 8. In some embodiments, the retention feature 30 of the support member 5 may be an outwardly protruding feature received in an inwardly protruding feature of the shaft 8 or vice versa. Various other means may be employed to militate against axial movement of the support member 5 relative to the shaft 8.

Figure 5:
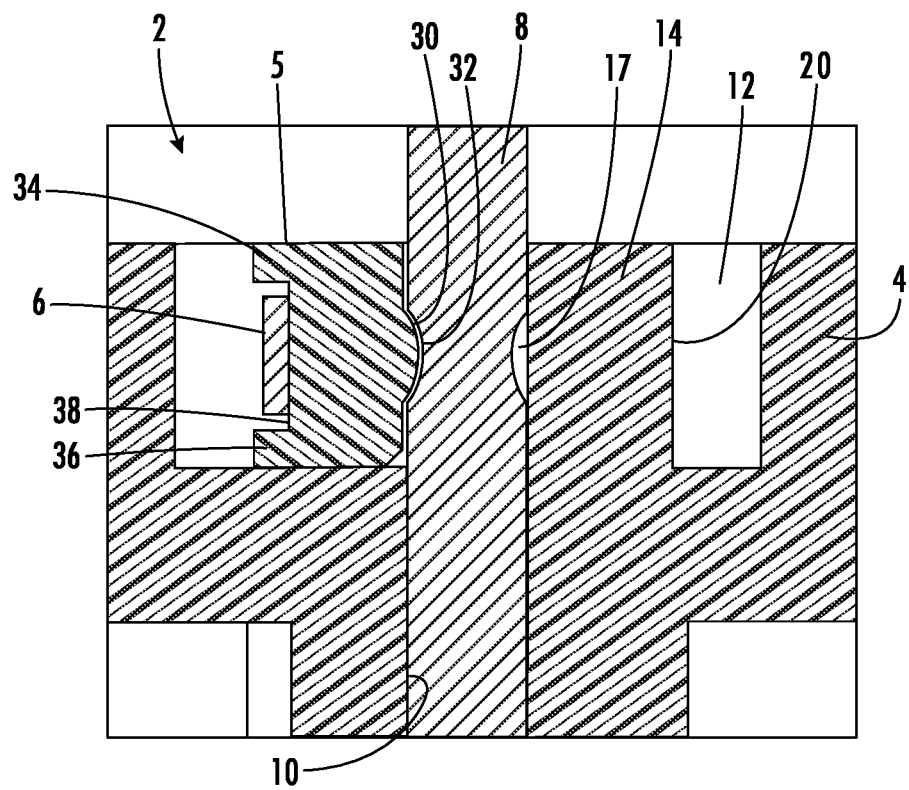
FIG. 5 is a cross-sectional view of a portion of the rotor of FIGS. 2-4.
Figures 6A, 6B:
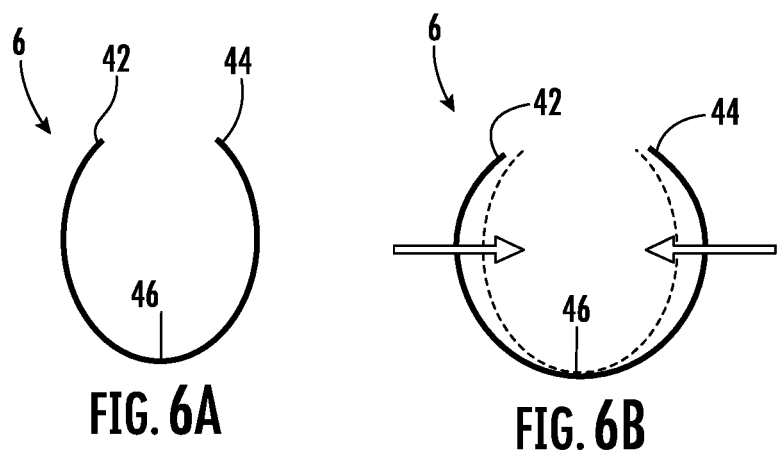
FIG. 6A is a top plan view of a resilient member of the rotor of FIGS. 2-5, wherein the resilient member is shown in a pre-installation form.
FIG. 6B is a top plan view of the resilient member of FIG. 6A, wherein the resilient member is shown in the pre-installation form in dashed lines and in a post-installation form in solid lines.

As best seen in FIG. 5, the support member 5 may further include a first protuberance 34 and an axially spaced apart second protuberance 36. The protuberances 34, 36 extend radially outwardly from the support member 5, forming a channel 38 therebetween. In certain embodiments, the protuberances 34 extend in a direction opposite the retention feature 30 away from the shaft 8. The channel 38 may have any suitable size, shape, and configuration to receive a portion of the resilient member 6 therein. When the resilient member 6 is installed, the protuberances 34, 36 militate against an axial movement of the resilient member 6 relative to the support member 5.

As illustrated in FIGS. 2-4, 6A, and 6B, the resilient member 6 may be generally C-shaped with a pair of spaced apart ends 42, 44. In some embodiments, the resilient member 6 may be a stamped part, in particular a stamped spring steel member. When installed, the resilient member 6 may be transformed from a pre-installation form (i.e., a generally elongate oval as shown by the solid line in FIG. 6A and the dashed lines in FIG. 6B), to a post-installation form (i.e., a generally circular shape as shown by the solid line in FIG. 6B). A central portion 46 of the resilient member 6 may be received in the channel 38 of the support member 5 and the projection 20 of the rotor body 4 may be received in a space between the ends 42, 44 of the resilient member 6.

The resilient member 6 may be tensioned around at least one of the support portion 14 of the rotor body 4 and the support member 5. When the resilient member 6 is installed, an interstice 45 may be formed between an outer radial surface of the support member 5 and an inner surface of the resilient member 6, which allow for proper tensioning of the resilient member 6 during operation of the rotor 2. In some embodiments, an outer radius of the support member 5 may be relatively smaller than an outer radius of the support portion 14 to also permit the proper tensioning of the resilient member 6. As a result of a centripetal force generated by a rotation of the rotor 2 during operation thereof, the resilient member 6 contacts the support member 5 at contact area A1, which presses the support member 5 against and into contact with the shaft 8 at one or more contact areas (e.g., contact areas A2, A3), and also contacts the support portion 14 at one or more contact areas (e.g., contact areas A4, A5), which draws the support portion 14 of the rotor body 4 to and into contact with the shaft 8, rotatably supporting the shaft 8 and militating against displacement of a central axis of the shaft 8 from the axis of rotation of the rotor 2. Hence, the support portion 14 of the rotor body 4, the support member 5, and the resilient member 6 cooperate so that the central axis of the shaft 8 and the axis of rotation of the rotor 2 remain in coaxial alignment.

In preferred embodiments, the resilient member 6 is specifically designed to abut the three contact areas A1, A4, A5 so that a continuous tensioning of the resilient member 6 around the support member 5 and support portion 14 is achieved even if wear of the support member 5 occurs. The resilient member 6 along with the support member 5 and the support portion 14 of the rotor body 4 militate against lateral movement in a first direction from the protuberances 34, 36 to the projection 20 and a second direction perpendicular to the first direction. A resilience of the resilient member 6 and/or a mass of the support portion 14 and/or a mass of the support member 5 may of such so that a center of mass of the rotor 2 is concentrically arranged about the central axis of the shaft 8 with no imbalance.

For assembly, the shaft 8 is disposed through the center bore 10 of the rotor body 4 and the support member 5 is fitted thereto. In a further step, the resilient member 6 is then be arranged so that the center portion of the resilient member 6 is received in the channel 38 of the support member 5. During installation of the resilient member 6, the ends 42, 44 thereof are slid over the tapered edge regions 16, 18 and sides 22, 24 of the projection 20 of the support portion 14 of the rotor body 4.

Figure 2:
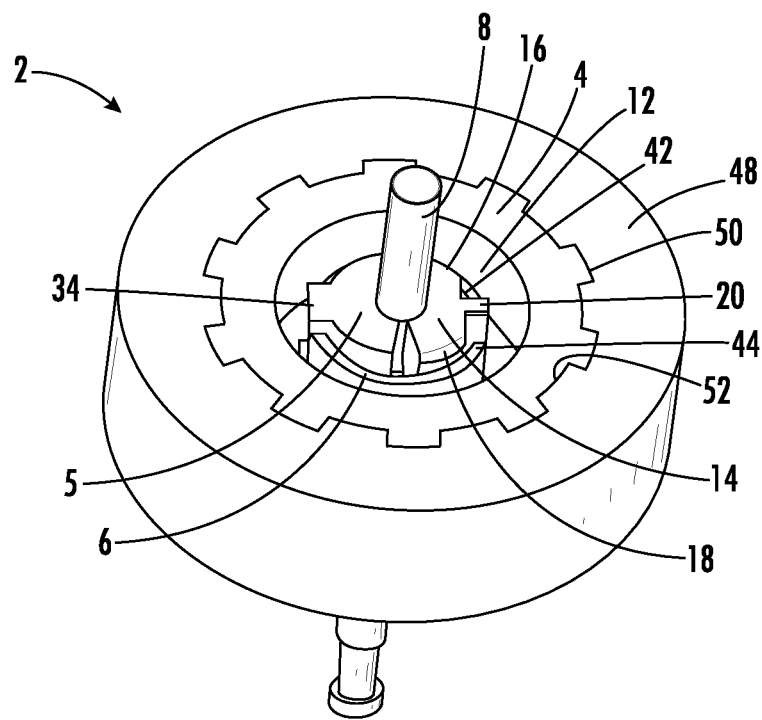
FIG. 2 is a perspective view of a rotor according to an embodiment of the present disclosure.

In some embodiments, the rotor 2 further includes a rotor magnet 48. The rotor magnet 48 surrounds the rotor body 4 and may be fixedly connected thereto. As best depicted in FIGS. 2 and 3, an outer circumferential surface of the rotor body 4 may include an annular array of spaced apart engaging elements 50. The engagement elements 50 of the rotor body 4 may be configured to cooperate with an annular array of engagement elements 52 formed on an inner circumferential surface of the rotor magnet 48. Various methods may be employed to connect the rotor body 4 to the rotor magnet 48. For example, the rotor body 4 may be injection molded, and thus mounted, by means of an injection molded method into the rotor magnet 48.

Figure 7:
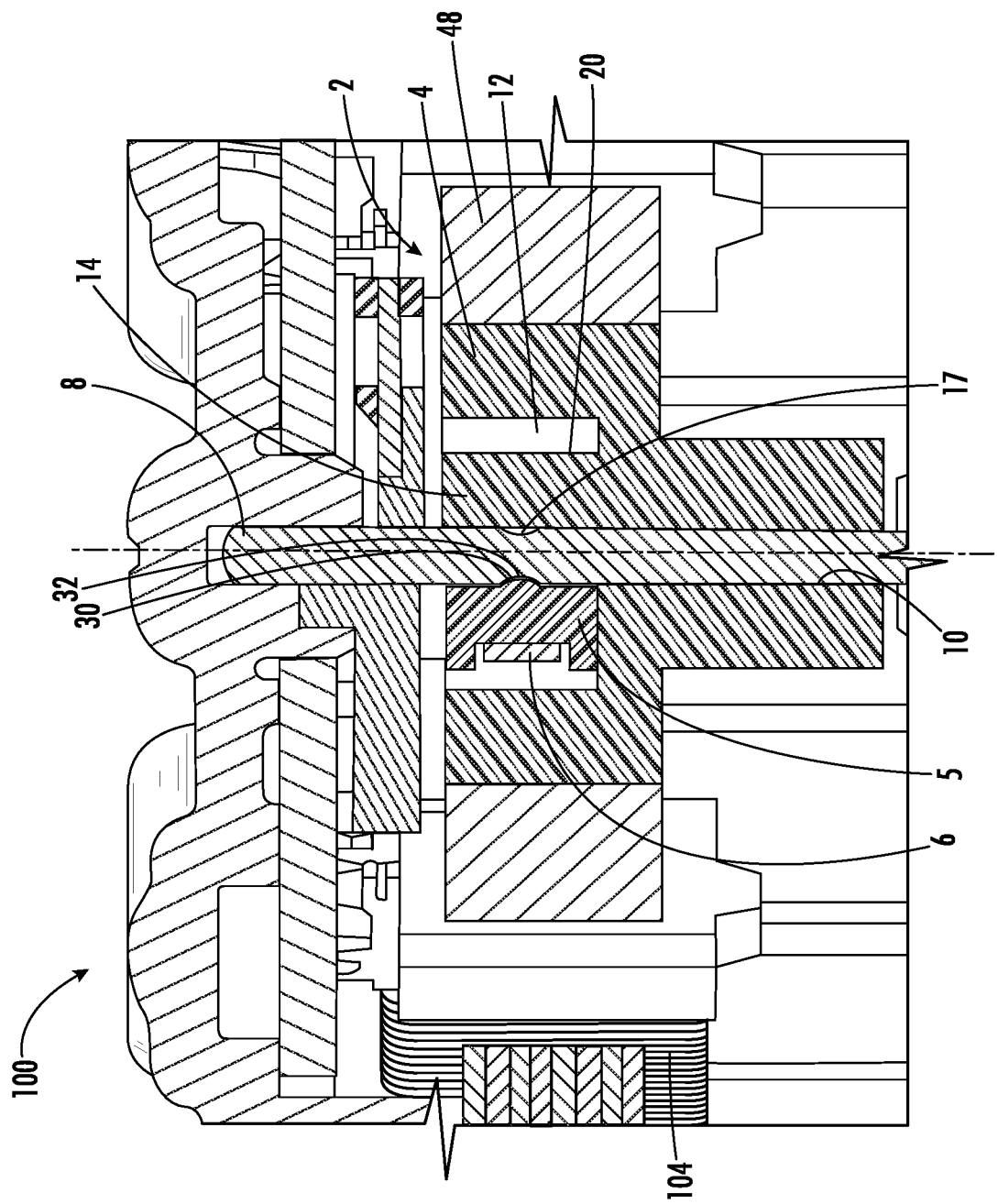
FIG. 7 is an enlarged cross-sectional view of a portion of an exemplary fluid valve system including the rotor of FIGS. 2-5.

In accordance with an embodiment of the present disclosure shown in FIG. 7, the rotor 2 may be part of an actuator 100 employed in various system applications, for example, a fluid valve system (not depicted). The actuator 100 may further include a stator 104 and the shaft 8. In certain applications, the actuator 100 may be configured to selectively control and/or actuate other components of the system.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A rotor, comprising:
   a rotor body disposed about a shaft;
   a first member provided with the rotor body and is adjacent the shaft; and
   a second member tensioned around one or more of the shaft, and/or at least a portion of the rotor body, and/or the first member, wherein the rotor body includes a support portion configured to cooperate with the second member.

2. The rotor of claim 1, wherein the support portion is integrally formed with a remainder of the rotor body.

3. The rotor of claim 1, wherein the support portion of the rotor body and/or the first member has a generally semicircular shape.

4. The rotor of claim 1, wherein the first member is disposed adjacent the shaft opposite the support portion of the rotor body.

5. The rotor of claim 1, wherein a lubricating fluid pocket is formed between the shaft and the support portion of the rotor.

6. The rotor of claim 1, wherein at least an edge region of the support portion of the rotor body is tapered to facilitate installation of the second member.

7. The rotor of claim 1, wherein the rotor body is configured to cooperate with a rotor magnet.

8. The rotor of claim 1, wherein an outer circumferential surface of the rotor body includes an annular array of spaced apart engagement elements, and wherein the annular array of spaced apart engagement elements is configured to cooperate with an annular array of spaced apart engagement elements formed on an inner circumferential surface of a rotor magnet.

9. The rotor of claim 1, wherein the first member includes a retention feature for maintaining a position of the second member relative thereto.

10. The rotor of claim 1 wherein the first member includes a first protuberance, a second protuberance, and a channel formed between the first and second protuberances, and wherein each of the first and second protuberances extends radially away from the shaft.

11. The rotor of claim 10, wherein the second member is configured to be received in the channel formed between the protuberances of the first member.

12. The rotor of claim 1, wherein the first member includes a retention feature to militate against a movement of the first member relative to the shaft.

13. The rotor of claim 12, wherein the shaft includes a retention feature corresponding to the retention feature of the first member to militate against relative movement between the shaft and the first member.

14. An actuator, comprising:
   a shaft having a central axis;
   a stator disposed about the shaft; and
   a rotor having an axis of rotation, and wherein the rotor includes:
      a rotor body disposed about the shaft;
      a first member provided with the rotor body and is adjacent the shaft; and
      a second member tensioned around one or more of the shaft, and/or at least a portion of the rotor body, and/or the first member, wherein the rotor body includes a support portion configured to cooperate with the second member.

15. A method of controlling rotor wear, comprising the steps of:
   providing a rotor having an axis of rotation, the rotor comprising:
      a rotor body disposed about a shaft, the shaft having a central axis;
      a first member provided with the rotor body and is adjacent the shaft; and
      a second member tensioned around one or more of the shaft, and/or at least a portion of the rotor body, and/or the first member; and
   generating centripetal force to substantially maintain coaxial alignment of the shaft and the rotor, wherein the rotor body includes a support portion configured to cooperate with the second member.

16. The method of claim 15, wherein the centripetal force is generated by a rotation of the rotor.

17. The method of claim 15, wherein the centripetal force causes the second member to contact at least one point on the rotor body and at least one point on the first member.

18. The method of claim 15, wherein the centripetal force causes the first member to contact at least one point on the shaft.

19. The method of claim 15, wherein the centripetal force causes the second member to militate against displacement of the shaft in a first direction and a second direction perpendicular to the first direction.

* * * * *